United States Patent
H'mimy et al.

(10) Patent No.: US 6,195,554 B1
(45) Date of Patent: Feb. 27, 2001

(54) CHANNEL ASSIGNMENT BASED ON UPLINK INTERFERENCE LEVEL AND CHANNEL QUALITY MEASUREMENTS WITH A FORWARD AND BACKWARD REASSIGNMENT STEP

(75) Inventors: Hossam H. H'mimy, Plano; Ali R. Shah, Dallas, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/250,629

(22) Filed: Feb. 16, 1999

(51) Int. Cl.$^7$ .................................................. H04Q 7/20
(52) U.S. Cl. ........................ 455/450; 455/423; 455/452; 455/513
(58) Field of Search ........................ 455/423, 450, 455/452, 453, 62, 509, 513

(56) References Cited

U.S. PATENT DOCUMENTS

| | | | |
|---|---|---|---|
| 5,093,924 | * | 3/1992 | Toshiyuki et al. ............... 455/33 |
| 5,212,831 | * | 5/1993 | Chuang et al. ................. 455/54.1 |
| 5,726,978 | * | 3/1998 | Frodigh et al. ................. 370/252 |
| 5,774,808 | * | 6/1998 | Sarkioja et al. ................. 455/436 |
| 5,852,780 | * | 12/1998 | Wang et al. ................... 455/450 |
| 5,956,642 | * | 9/1999 | Larsson et al. ................. 455/449 |
| 5,966,657 | * | 10/1999 | Sporre ........................ 455/425 |
| 6,006,092 | * | 12/1999 | Ward ......................... 455/438 |

\* cited by examiner

Primary Examiner—Fan Tsang
Assistant Examiner—Blane J. Jackson
(74) Attorney, Agent, or Firm—Arthur I. Navarro

(57) ABSTRACT

A method (40) and device (42) for assigning transmission channels in a wireless communications network (38). The frequencies of the network (38) are discriminated to determine which transmission channels have a predetermined blocking threshold of interference. A transmission channel is preassigned with a channel quality less than the predetermined blocking threshold of interference to an incoming call. The channel quality and interference level of the preassigned transmissions channel are continually monitored, and another transmission channel is assigned to the call when the monitored levels of channel quality and interference levels change beyond a set of predetermined thresholds. Forward and backwards channel reassignments are performed depending on the channel quality and interference levels.

16 Claims, 2 Drawing Sheets

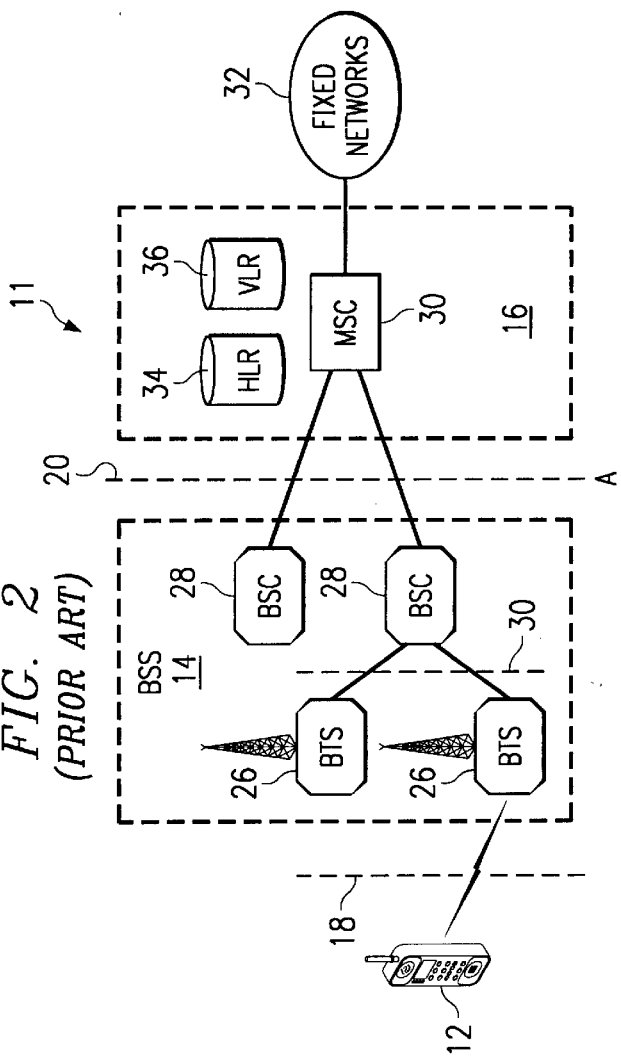
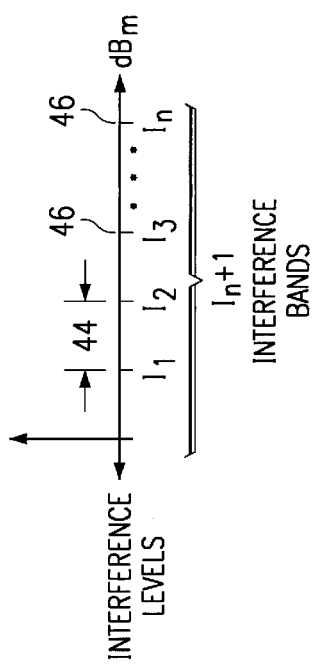
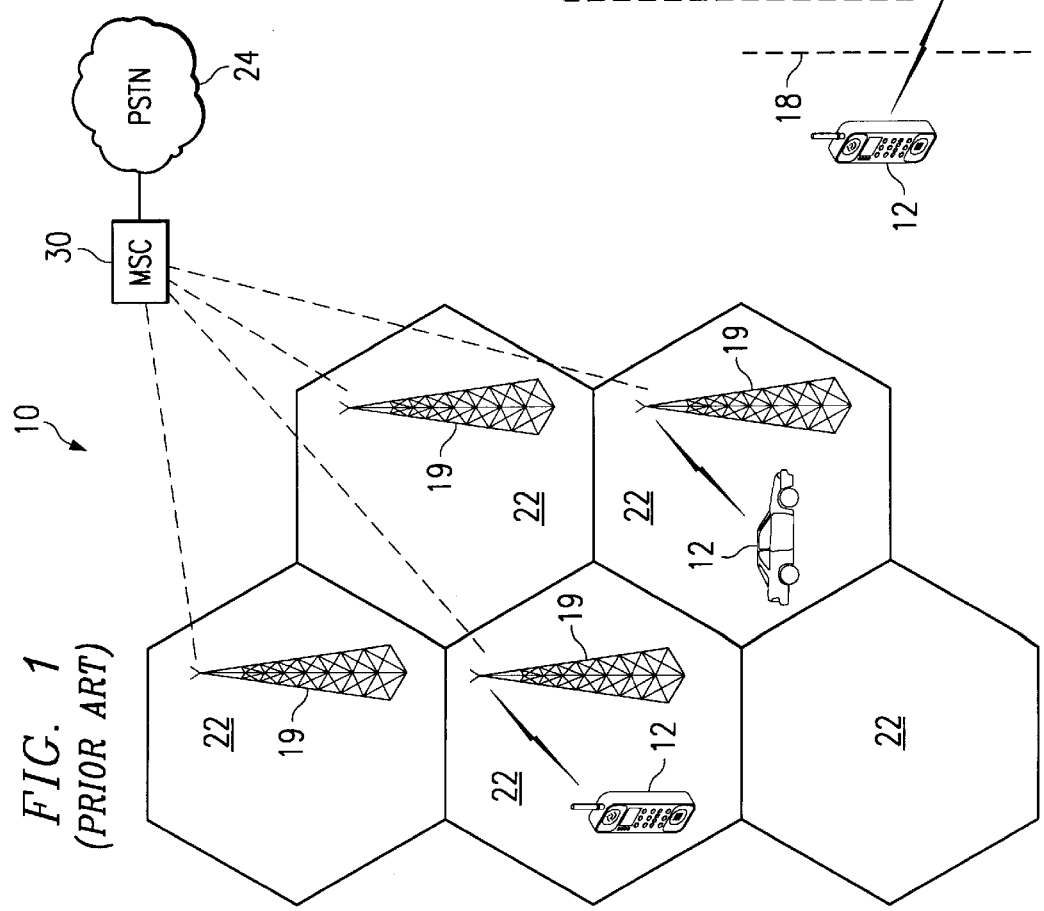

CHANNEL ASSIGNMENT BASED ON UPLINK INTERFERENCE LEVEL AND CHANNEL QUALITY MEASUREMENTS WITH A FORWARD AND BACKWARD REASSIGNMENT STEP

CROSS-REFERENCE TO RELATED APPLICATIONS

The following U.S. Patent Application is commonly assigned and is incorporated herein by reference:

| Patent No. | Serial No. | Inventor | Title |
| --- | --- | --- | --- |
| TBD | 09/224,069 | H'mimy et al. | System and Method for Channel Assignment Based Upon Interference and Channel Quality Measurements |

TECHNICAL FIELD

This invention relates generally to wireless communication systems, and more particularly to a method and device for reassigning a transmission channel based on interference level and channel quality measurements.

BACKGROUND OF THE INVENTION

Wireless communication technology has experienced unprecedented growth, fueled by advances in radio frequency, satellite, and microelectronic technologies and by the convenience of access to telephony and portable wireless devices. Several technologies have emerged for providing wireless communications, including analog systems such as Advanced Mobile Phone System (AMPS), and digital systems such as Global System for Mobile Communications (GSM) and Digital AMPS (D-AMPS). Cellular radio systems operate in an interference-limited environment and typically rely on frequency reuse plans and Frequency Division Multiple Access (FDMA), in analog systems, and Time Division Multiple Access (TDMA), in digital systems, for example, to maximize capacity.

Because bandwidth and radio spectrum are limited resources shared by all users in a wireless network, schemes to divide the available network bandwidth among as many subscribers as possible are often employed. One such scheme involves a combination Time and Frequency Division Multiple Access (TDMA/FDMA) method. For example, 25 MHZ bandwidth can be divided into 124 carrier frequencies spaced 200 kHz apart, with one or more carrier frequencies assigned to each Base Station in the network. Each of the carrier frequencies, in turn, can be divided in time using a TDMA scheme to define logical channels. Channels, in turn, may be divided into dedicated subchannels which are allocated to a mobile station with common channels used by mobile stations in the idle mode.

A Traffic Channel (TCH) is used to carry speech and data signals. Traffic channels are defined in GSM using a 26 multi-frame, or a group of 26 TDMA frames. With 26 frames, 24 can be used for traffic, one for a control channel, and one unused. In other systems, other methods are used, such as CDMA or FDMA. An Idle Channel Measurement (ICM) algorithm that uses dynamic channel assignment is usually utilized by the Base Station Controller (BSC) to select channels for transmission of speech and data signals.

In addition to dividing bandwidth among subscribers, transmission channels are assigned or allocated to incoming calls to the network. Two methods of channel assignment are typically used in the industry: fixed channel assignment and dynamic channel assignment. Fixed channel assignment involves assigning a predetermined set of channels or frequencies to the base station or BSC. If all the channels within the cell of the base station or BSC are occupied, either the call is blocked, meaning the mobile handset does not receive service, or borrowing strategies are used to borrow channels from neighboring cell. With dynamic channel assignment, channels are not allocated to a base station or BSC permanently. The Mobile Switching Center (MSC) assigns the BSC some frequencies, which remain fixed for a period of time. Periodically, some measurements are made regarding channel utilization, and adjustments are made to the channel assignments as needed. The frequencies or channels are assigned by the BSC each time a call request is made.

A problem with prior art channel assignment algorithms and devices is that channel assignments are made based on the best interference level available. This results in an unbalanced use of traffic channels, with all voice and data calls being assigned to the best quality transmission channels even when a lower quality channel is available to service a call. Continuous monitoring of transmission channel interference levels and improved assignment algorithms would provide a more balanced network which could be utilized by a greater number of subscribers.

SUMMARY OF THE INVENTION

The present invention achieves technical advantages by reassigning transmission channels in a wireless communications network based on interference levels and channel quality using forward and backward reassignment. Interference measurements and channel quality measurement are used to reassign a call to a higher or lower quality channel, freeing up the network for more calls. The use of medium level quality channels rather than high quality channels results in a better balanced network and improved transmission channels in the network.

According to the present invention, disclosed is a method of assigning transmission channels based on channel quality and interference level. The frequencies of the network are discriminated to determine which transmission channels have interference thresholds less than a predetermined blocking threshold of interference, and a transmission channel is preassigned with an interference level less than the predetermined blocking threshold to an incoming call. The channel quality and interference level of the preassigned transmission channel are continually monitored, and a transmission channel is reassigned to the incoming call when the monitored levels of channel quality and interference levels change beyond a set of predetermined thresholds.

Also disclosed is a method of assigning transmission channels in a wireless communications network based upon interference and channel quality measurements. The method includes the steps of discriminating the frequencies of the network to determine which transmission channels have a interference level less than a predetermined blocking threshold of interference. Next, the channel with the highest available interference level less than the blocking threshold is preassigned to an incoming call. The remaining transmission channels are categorized based on channel quality and interference levels in the network using a rule table that creates bands of interference and channel quality. Next, a decision is made whether to continue the call on the first channel, drop the call, reassign the call to another channel with more interference than the current channel, or reassign the call to a channel having interference less than the current channel, based upon the measured channel quality and the interference levels. A tradeoff is made between good quality on some channels and bad quality on other channels to achieve a more uniform quality distribution across the network.

Also disclosed is a device for assigning transmission channels in a wireless communications network. The device includes an algorithm comprising a discrimination function adapted to discriminate the frequencies of the network to determine which transmission channels are less than a predetermined blocking threshold of interference, and a preassignment function adapted to preassign a first transmission channel with an interference level within a band less than the predetermined blocking threshold of interference to an incoming call. The algorithm also includes a monitoring function adapted to continually monitor the channel quality and interference level of the preassigned transmission channel, and a reassignment function for reassigning a second transmission channel to the incoming call when the monitored levels of channel quality and interference levels change beyond a set of predetermined thresholds. A rule table is stored in the device and utilized to reassign transmission channels in a wireless network on channel quality and interference level measurements.

By providing for both forward and backward reassignment, the invention is particularly advantageous to fully utilized networks with heavy traffic conditions. A further advantage is improved balance in the use of transmission channels of the wireless network. When the overall channel quality becomes more uniform over the entire network, a higher capacity can be achieved. Another advantage includes the free-up of low interference channels.

BRIEF DESCRIPTION OF THE DRAWINGS

The above features of the present invention will be more clearly understood from consideration of the following detailed description in connection with accompanying drawings in which:

FIG. 1 illustrates a typical cellular network 10 of the prior art;

FIG. 2 shows a GSM network 11 in which the present invention may be employed;

FIG. 4 shows the interference bands 44 and interference levels 42 of the present invention.

Corresponding numerals and symbols in the different figures refer to corresponding parts unless otherwise indicated.

DETAILED DESCRIPTION OF PREFERRED EMBODIMENTS

Figure 3:
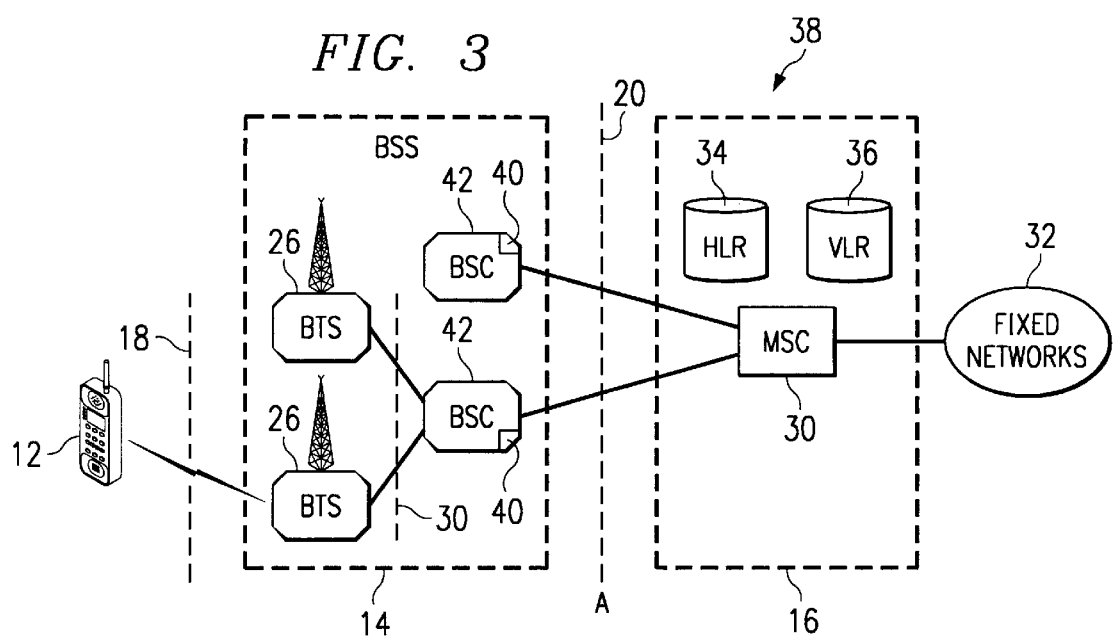
FIG. 3 illustrates a GSM network 38 with the channel assignment algorithm 40 of the present invention.

FIG. 1 shows a diagram of a wireless communications network 10 of the prior art. The network 10 preferably comprises a wireless telephony network including an originating mobile station (MS) 12. The originating MS 12 is preferably a wireless communication device comprising a wireless cellular-type mobile station, such as a Personal Communications Service (PCS) or cellular phone, but may also include a computer, a Personal Digital Assistant (PDA), or other wireless terminal, for example. A base station 19 provides cellular coverage via an RF link to the MS 12 and other mobile stations within the cell 22 of the base station 19. Several base stations 19 service a single MSC 30 to provide continuous coverage during mobility of the MS 12. For illustrative purposes, the cell 22 surface area is shown as hexagonal, but the RF wave propagation is actually more circular in coverage area. As the MS 12 moves from one cell 22 to an adjacent cell 22, the call or data transmission is handed over to another base station 19 by the Mobile Switching Center (MSC) 30, which handles call switchovers and mobility management. MSC 30 is in communication with fixed networks such as the Public Switched Telephone Network (PSTN) 24 or an optical network, for example.

FIG. 2 shows the layout of a GSM network 11 comprised of three main parts: a mobile station 12, a Base Station Subsystem (BSS) 14, and network subsystem 16. Mobile station 12 is typically a cellular telephone that is carried by the subscriber, although other terminal devices such as laptops or fax machines may be used to communicate over the GSM network 11. The network subsystem 16, the main part of which is the Mobile Switching Center (MSC) 30, performs the switching of calls between the mobile and other fixed or mobile network users, as well as mobility management. The mobile station 12 and the BSS 14 communicate with one another across the Um interface 18, also known as the air interface or radio link, which is controlled by the BSS 14. The BSS 14 communicates with the MSC 30 of network subsystem 16 across an A- interface 20. MSC 30 communicates with fixed network 32 which may be the PSTN or other cellular networks, for example.

The mobile station 12 comprises a mobile transceiver of the type found in many cellular phonesets and a Subscriber Identity Module (SIM). The SIM includes a identity indicator, a secret key for authentication, and other relevant network/user information. The mobile transceiver is uniquely identified by the International Mobile Equipment Identity (IMEI). The identification features of the MS 12 are independent, thereby allowing mobility of the user about the service area of the GSM network 11.

The Base Station Subsystem (BSS) 14 comprises two parts: the Base Transceiver Station (BTS) 26 and the Base Station Controller (BSC) 28. BTS 26 communicates across the standardized Abis interface 30 with BSC 28, allowing operation between components. BTS 26 houses radio transceivers that define a cell and handles the radio-link protocols with the mobile handset 12. In a large urban area, there may be a large number of BTSs 26 deployed. BSC 28 manages the radio resources for one or more BTSs 26, and, as such, there may be several BSCs 28 within a single BSS 14. Among the functions of the BSC 28 are radio-channel setup, frequency hopping, and handovers. BSC 28 provides a connection mechanism between the mobile handset 12 and the MSC 30 of network subsystem 16 which acts as the interface to one or more fixed networks 32.

The central component of the network subsystem 16 is the Mobile Switching Center (MSC) 30, which acts like a normal switching node of the Public Switched Telephone Network (PSTN), and provides all of the functionality needed to handle a mobile subscriber, such as registration, authentication, location updating, handovers, and call routing to roaming subscribers. These functions are provided in conjunction with several other network entities, which together form the network subsystem 16.

The MSC 30 provides the connection mechanism to the fixed networks 32 which may include the PSTN or an Integrated Service Digital Network (ISDN), for example. The Home Location Register (HLR) 34 and Visitor Location Register (VLR) 36, together with the MSC 30, provide call routing and roaming capabilities for the GSM network 11. In particular, the HLR 34 contains administrative information of the subscriber registered in the corresponding GSM network 11, along with the current location of the mobile handset 12. Likewise, the VLR 36 contains selected administrative information from HLR 34 necessary for call control and provisioning of the subscriber services for each mobile currently located in the geographical area controlled by the VLR 36. Other registers are used for authentication and security functions within the network subsystem 16.

Related patent application entitled "A System and Method for Channel Assignment Based on Uplink and Interference Level in Channel Quality Measurements" filed in December 1998 involves a forward reassignment, where channels are reassigned to channels with lower interference level if the quality measure satisfies certain conditions. Before the MS 12 is assigned to a channel upon a call request, the BSC 28 measures the interference level of all channels available, and then selects some of the channels and marks them as a preassignment channel which will be assigned to the MS 12 call request. Then when the MS 12 is reassigned to the specific channel, the quality is continually monitored. The quality measured may be the Bit Error Rate (BER) for digital networks, or carrier/interference (C/I) for analog networks, for example. If the quality measurement satisfies certain conditions, then the call is either reassigned to another channel having a better or lower interference level, keeps the channel the same as it is, or drops the call. This process of searching for a channel with a lower interference level and reassigning the call to a better channel is referred to as a forward reassignment. Other channel assignment algorithms of the prior art also focus on searching for a channel with a better quality, e.g., a lower interference level.

A problem with prior art assignment and reassignment algorithms is that a wireless network 10 or 11 may become saturated, especially in the channels having a low interference level, because all calls are being assigned to the channels with good quality. The wireless network becomes unbalanced, with many more calls being assigned to the lower interference level channel than for medium interference level channels or high interference channels. A method and algorithm is needed that provides a better balance to the channel assignment of the wireless network and prevents overloading of the low-level interference channels.

The present invention provides a more uniform distribution of transmission channels by using a reverse reassignment algorithm to redirect calls away from the low interference channels and reassign them to medium interference level channels. With the present invention, a device measures the interference level and channel quality of available channels and categorizes them into different grades or classifications. Rather than reassigning calls or data transmissions to low interference level and good quality transmission channels, the present algorithm focuses on balancing the network and performing reverse and forward reassignments as required.

Referring next to FIG. 3, an improved wireless communications network 38 according to the present invention is shown comprising mobile station 12 in communication with other networks such as fixed networks 32 through the various devices and systems as described in FIG. 2 of the prior art. BSC 42 of the present invention includes a channel assignment algorithm 40 which provides instructions to the BSC 42 for the set-up and iteration of the channel assignment. The Channel Assignment Algorithm (CAA) 40 of the present invention is shown located at the BSC 42, but the CAA 40 may be located in other devices of the wireless communications network 38 depending on the type of network. For example, the CAA 40 may be located in a base station 19 or BSS 14, or other similar devices.

The CAA 40 of the present invention includes a setup step in which the interference measurements are divided into bands and categories of interference and channel quality, respectively. The algorithm includes an iteration step where incoming requests for services (e.g., calls or data transmissions) are assigned to channels. First, the uplink interference is measured on channels in the system, and the measured interference is divided into "n" thresholds specified as interference levels. The actual value of "n" depends on the requirements of the system. The larger value of "n" usually imposes a greater amount of processing requirements to implement the algorithm CAA 40. Given "n" interference levels, $I_1, I_2, \ldots I_n$, there are "n+1" interference bands $I^1, I^2, \ldots I^{n+1}$, as shown in FIG. 4. The mapping between the interference levels and the interference bands is shown in Table 1, which is a definition of the interference band based interference levels in the system.

TABLE 1

| Condition | Interference Band |
|---|---|
| $I > I_n$ | $I^{n+1}$ (blocked interference band) |
| $I_{n-1} < I < I_n$ | $I^n$ |
| ... | ... |
| $I_1 < I < I_2$ | $I^2$ |
| $I < I_1$ | $I^1$ |

The highest interference band is always blocked, which implies that $I_n$ is the "blocking threshold". The blocking threshold depends on the system implementation.

The channel quality is divided into n+1 categories $Q^1$, $Q^2, \ldots Q^{n+1}$ where "n" is the number of interference thresholds. There is a correspondence between channel quality categories and the Channel Quality Measurements (CQM), carrier to interference ratio (C/I) for analog and BER measurements for digital. The channel quality categories according to one embodiment are shown in Table 2.

TABLE 2

| Category | Analog | Digital |
|---|---|---|
| $Q^{m+1}$ | $C/I > (C/I)^m$ | $BER < BER_1$ |
| $Q_m$ | $(C/I)_{m-1} < C/I < (C/I)_m$ | $BER_2 > BER > BER_1$ |
| $Q^{m-1}$ | $(C/I)_{m-2} < C/I < (C/I)_{m-1}$ | $BER_3 > BER > BER_2$ |
| ... | ... | ... |
| $Q^2$ | $(C/I)_1 < C/I < (C/I)_2$ | $BER_{m-2} > BER > BER_{m-1}$ |
| $Q^1$ | $C/I < (C/I)_1$ | $BER > BER_m$ |

For simplicity, the interference bands are divided coarsely into high, moderate and low interference subcategories. $I^H$, $I^M$, $I^L$ and $Q^H$, $Q^M$, $Q^L$ respectively. However, it is seen that more subcategories may be utilized, in the present invention.

The mapping between coarse CQM bands and CQM bands of Table 1 and 2 is shown in Table 3.

TABLE 3

| Coarse CQM Band | CQM Band |
|---|---|
| $Q^H$ | $Q^{m+1}, \ldots, Q^j$ |
| $Q^M$ | $Q^{j+1}, \ldots, Q^k$ |
| $Q^L$ | $Q^{k+1}, \ldots, Q^1$ |

Where m>j>k. Similarly, the coarse interference band mapping with interference bands in Table 1 is shown in Table 4, where n>w>u.

TABLE 4

| Coarse Interference Band | Interference Band |
| --- | --- |
| $I_H$ | $I^{n+1}, \ldots, I^w$ |
| $I_M$ | $I^{w-1}, \ldots, I^u$ |
| $I_L$ | $I^{u-1}, \ldots, I^1$ |

Figure 5:
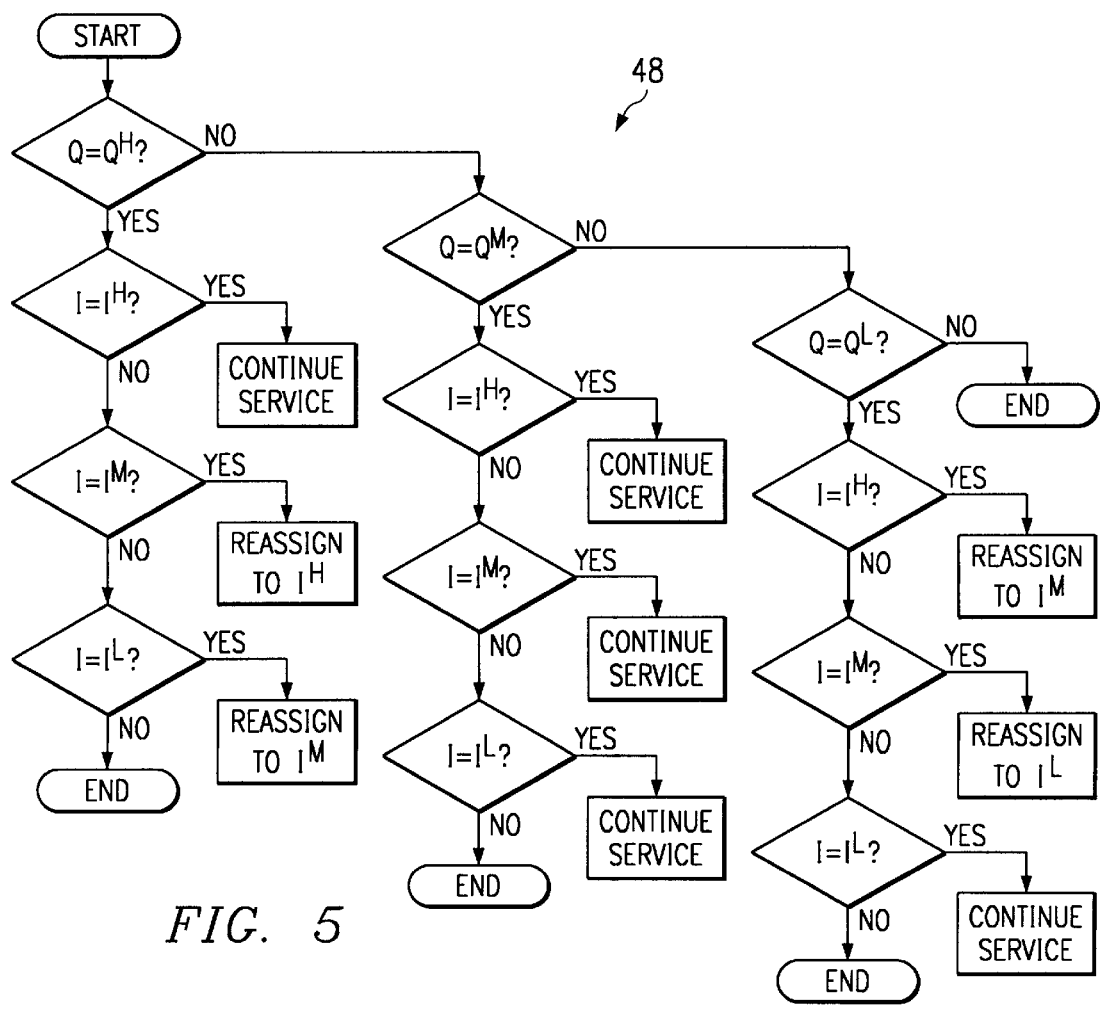
FIG. 5 is a flow chart of the algorithm of the present invention.

The present invention utilizes a rule table that suggests forward and backward channel reassignment based on a fixed reassignment step. Table 5 is an example of a rule table with rules for reassignment based on the channel quality category and the interference band. FIG. 5 is a flow chart illustrating the re-assignment determinations of the rule table shown in Table 5.

TABLE 5

| Band/Category | $I^H$ | $I^M$ | $I^L$ |
| --- | --- | --- | --- |
| $Q^H$ | Continue | R -> $I^H$ | R -> $I^M$ |
| $Q^M$ | Continue | Continue | Continue |
| $Q^L$ | R -> $I^M$ | R -> $I^L$ | Continue |

The CAA 40 requires measuring the interference level on each base station for all possible channels. Then the channels are discriminated based on their interference levels. The incoming service is pre-assigned to a relatively high interference channel depending on channel availability. Then the channel quality category "$Q^i$", where $\{i=1, 2, \ldots n+1\}$ is determined based on the C/I or BER measurements, as shown in Table 2.

Depending on the channel quality category, the call or data transmission is either kept on the same channel, reassigned to a channel corresponding to a lower interference band in accordance with the reassignment step, or the call may be dropped/handed-off. A call is dropped if a hand-off candidate is not available. The reassignment to a channel in a lower interference band ensures an interference level on the reassigned channel below the one on the preassigned channel by a predetermined value, increasing channel quality by at least a predetermined value. The CAA 40 is triggered either by increased saturation in the cell and unavailability of channels with low interference, or by the service supplier on a regular basis. The two stages of the algorithm include a set-up stage, which comprises taking uplink interference measurements and channel discrimination based on interference levels; and an iteration stage, which includes preassignment and channel quality measurement, and action based upon on a rule table.

In accordance with the CAA 40, the BSC 42 continuously measures the interference level on unused devices or traffic channels. Channels having interference levels (I) greater than $I_n$ are blocked, meaning that they will not be assigned to incoming calls. The remaining unused channels are categorized in accordance with Table 1. Thus, a list of channels is compiled that categorizes them in accordance with the uplink interference level.

In the iteration stage of the present algorithm, each incoming request for service is pre-assigned a channel, followed by a channel quality measurement (CQM). Table 2 is utilized to ascertain the channel quality category $Q^j$, $\{j=1, 2, \ldots, m+1\}$. Then service is either continued, re-assigned or handed off based on rule Table 5 and the flow chart of FIG. 5 that utilizes both the interference band and the channel quality category as a basis. Incoming service or calls are pre-assigned to the channels with the highest available interference level (barring the blocked channels). The CQM (C/I for analog or BER for digital channels) is measured on the pre-assigned channels and then mapped to a channel quality category using Table 2.

The desired result of the rule Table 5 is to achieve uniform quality distribution and to achieve a homogeneous quality level of service throughout the network 38. The algorithm trades good quality on some channels with bad quality on others to achieve a balance on the network 38 having a predominately medium level interference and channel quality.

The CAA 40 for implementing the rule table for the iteration shown in the flow chart 48 shown in FIG. 5. The effect of reassigning channels based on the rule table is that if $Q=Q^H$ and if $I=I^M$, the reassignment to $I^H$ results in $Q=Q^M$. If $Q=Q^H$ and if $I=I^L$ then reassignment to $I^M$ results in $Q=Q^M$. Finally, if $Q=Q^L$ and if $I=I^H$, the reassignment to $I^M$ results in $Q=Q^M$; and if $I=I^M$, the reassignment to $I^L$ results in $Q=Q^M$. The reassignment actions of the present invention preferably result in obtaining a moderate or medium quality level. Service is continued if the call is in the medium quality band or if there is no further room to improve the service.

The coarse interference bands are optimized in a manner (for w, u) such that the objective of uniform quality is maximized. The values of w, u are preferably based on the statistical distribution of the interference level; however, the percentile for the moderate subcategory should be greater than the high or low subcategories, because all the reassignments fall into the moderate band.

The coarse quality bands are optimized in a manner (for k and j) such that the objective of moderate quality subcategory is maximized. This may be done on an interactive basis by first setting thresholds for the subcategories percentiles and calculating the new percentile after a determined time. If the percentile of the high and low subcategories exceeds the threshold, then the border band may be added/removed from the moderate subcategory until it meets the threshold.

The novel method and device for transmission channel assignment based on uplink interference level and channel quality measurements of the present invention achieves technical advantages with the use of a forward and backward reassignment step. Advantages include preventing or reducing the number of dropped connections where the wireless network 38 is fully utilized. A further advantage is improved balance in the use of transmission channels of the wireless network, with the emphasis on moderate quality channel reassignment. Another advantage includes preventing overloading of low interference channels.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, while the invention is described herein for use in a GSM network 38, the device and method may be used for channel allocation in other communications networks using FDMA or TDMA, for example. The channel quality measurements of the present invention are preferably based on either C/I (for analog) or BER (for digital) for the preassigned channels, but may be based on some other measure of channel quality. It is therefore intended that the appended claims encompass any such modifications or embodiments.

What is claimed is:

1. In a wireless communications network having a plurality of frequencies for providing service, a method of assigning transmission channels based on channel quality and interference measurement level comprising the steps of:

discriminating said frequencies of said network to determine which transmission channels have an interference level less than a predetermined blocking threshold of interference;

preassigning a transmission channel with an interference level less than said predetermined blocking threshold to an incoming call, wherein said transmission channel is available with the highest interference level less than the blocking threshold to said incoming call;

monitoring the channel quality and interference levels of said preassigned transmission channel continuously, wherein said channel quality and interference levels include Bit Error Rate (BER) and Carrier to Interference (C/I) values of said transmission channels in said network;

dividing the set of predetermined thresholds of channel quality into low, medium and high thresholds;

dividing the set of predetermined thresholds of interference levels into low, medium and high thresholds; and determining whether to continue said call on said preassigned channel, drop said call, or reassign said call when the levels of channel quality and interference change beyond a set of predetermined thresholds.

2. The method of claim 1 wherein said determining step comprises continuing said call on said preassigned transmission channel when:

said channel quality is high and said interference level is high;

said channel quality is medium and said interference level is high;

said channel quality is medium and said interference level is medium;

said channel quality is medium and said interference level is low; and said channel quality is low and said interference level is high.

3. The method of claim 1 wherein said determining step comprises reassigning said call to a channel having a high interference level when said channel quality is high and said interference level is medium.

4. The method of claim 1 wherein said determining step comprises reassigning said call to a channel having a medium interference level when said channel quality is high and said interference level is low.

5. The method of claim 1 wherein said determining step comprises reassigning said call to a channel having a medium interference level when said channel quality is low and said interference level is high.

6. The method of claim 1 wherein said determining step comprises reassigning said call to a channel having a low interference level when said channel quality is low and said interference level is medium.

7. A method of assigning transmission channels in a wireless communications network having a plurality of frequencies based upon interference measurements and channel quality measurements, said method comprising the steps of:

discriminating said frequencies of said network to determine which transmission channels have a interference level less than a predetermined blocking threshold of interference;

preassigning a first channel with an interference level less than said predetermined blocking threshold to an incoming call, said first channel being an available transmission channel with the highest interference level less than said blocking threshold;

dividing said interference levels into thresholds;

measuring a channel quality of transmission channels in said network;

dividing said channel quality into thresholds; and determining whether to continue said call on said first channel, drop said call, reassign said call to a second channel having an interference value higher than said interference value of said first channel, or reassign said call to a third channel having an interference value lower than said interference value of said first channel, based upon said measured channel quality and said interference levels.

8. The method according to claim 7 wherein said step of dividing said interference levels into thresholds comprises dividing said interference levels into low, medium and high thresholds, wherein said step of dividing said channel quality into thresholds comprises dividing said interference levels into low, medium and high thresholds, and wherein said determining step comprises continuing said call on said first channel when:

said channel quality is high and said interference level is high;

said channel quality is medium and said interference level is high;

said channel quality is medium and said interference level is medium;

said channel quality is medium and said interference level is low; and said channel quality is low and said interference level is high.

9. The method of claim 8 wherein said determining step comprises reassigning said service to a channel having a medium interference level when said channel quality is high and said interference level is low and when said channel quality is low and said interference level is high.

10. The method of claim 8 wherein said determining step comprises reassigning said service to a channel having a low interference level when said channel quality is low and said interference level is medium.

11. The method of claim 8 wherein said determining step comprises reassigning said service to a channel having a high interference level when said channel quality is high and said interference level is medium.

12. In a wireless communications network having a plurality of frequencies, a device for assigning transmission channels, said device including an algorithm comprising:

a discrimination function adapted to discriminate said frequencies of said network to determine which transmission channels are less than a predetermined blocking threshold of interference;

a preassignment function adapted to preassign a first transmission channel with an interference level less than said predetermined blocking threshold to an incoming call;

a monitoring function adapted to continually monitor the channel quality and interference levels of the preassigned transmission channel;

a reassignment function for reassigning a second transmission channel to said incoming call when the monitored levels of said channel quality and said interference change beyond a set of predetermined thresholds; and a categorization function for dividing said predetermined channel quality thresholds into low, medium and high thresholds, and for dividing said predetermined interference level thresholds into low, medium and high thresholds.

13. The device of claim 12 wherein said algorithm comprises rules corresponding with interference and channel quality levels for said transmission channels, wherein said channel reassignment is based on a select one of said rules.

14. The device of claim 12 wherein said network further includes a Base Station Subsystem (BSS).

15. The device of claim 14 wherein said BSS further comprises a Base Transceiver Station (BTS) and Base Station Controller (BSC), wherein said BSC is configured to house said algorithm.

16. The device of claim 12 wherein said algorithm further includes a measuring function adapted to measure channel quality of said transmission channels in said network.

* * * * *